US007860746B1

(12) United States Patent  
Fitch et al.

(10) Patent No.: US 7,860,746 B1  
(45) Date of Patent: Dec. 28, 2010

(54) SYSTEM AND METHOD FOR DETERMINING PAID TAXES

(75) Inventors: Todd Matthew Fitch, Santa Clara, CA (US); Thomas Frasher, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 11/831,885

(22) Filed: Jul. 31, 2007

(51) Int. Cl.
*G06Q 20/00* (2006.01)
*G06F 17/22* (2006.01)
*G07F 19/00* (2006.01)

(52) U.S. Cl. .............................. 705/19; 705/30; 705/31

(58) Field of Classification Search .................. 705/15, 705/16, 19, 21, 26, 30, 31, 35, 14, 42, 39, 705/67; 235/375, 379; 707/1
See application file for complete search history.

(56) References Cited

U.S. PATENT DOCUMENTS

| 3,944,801 | A | * | 3/1976 | Montana ...................... 705/19 |
| 3,946,217 | A | * | 3/1976 | Tsujikawa et al. ............ 705/19 |
| 5,335,169 | A | * | 8/1994 | Chong ......................... 705/31 |
| 5,799,283 | A | * | 8/1998 | Francisco et al. ............. 705/19 |
| 6,078,898 | A | * | 6/2000 | Davis et al. ................... 705/19 |
| 6,141,650 | A | * | 10/2000 | Iwasa et al. ................... 705/19 |
| 7,392,224 | B1 | * | 6/2008 | Bauer et al. ................... 705/41 |
| 7,437,330 | B1 | * | 10/2008 | Robinson et al. ............. 705/67 |
| 7,523,055 | B2 | * | 4/2009 | Anderson et al. ............. 705/35 |
| 7,627,750 | B1 | * | 12/2009 | Chan .......................... 713/156 |

(Continued)

OTHER PUBLICATIONS

"Frequently Asked Multistate Tax Questions." Journal of State Taxation Jul. 1, 2005: ABI/INFORM Global, ProQuest. Web. Aug. 26, 2010.*

(Continued)

*Primary Examiner*—Matthew S Gart
*Assistant Examiner*—Olusegun Goyea
(74) *Attorney, Agent, or Firm*—Osha • Liang LLP (57) ABSTRACT

A method for determining paid taxes including obtaining a total price of a purchase following a transaction involving the purchase, determining a tax jurisdiction associated with the first purchase, determining a tax rate based on the tax jurisdiction, extracting a paid tax from the total price based on the tax rate, calculating a tax sum based on the paid tax, and completing a section of a form using the tax sum.

32 Claims, 4 Drawing Sheets

U.S. PATENT DOCUMENTS

| | | | |
|---|---|---|---|
| 2002/0111888 A1* | 8/2002 | Stanley et al. | 705/31 |
| 2002/0123949 A1* | 9/2002 | VanLeeuwen | 705/35 |
| 2003/0078857 A1* | 4/2003 | Ookushi | 705/26 |
| 2003/0101112 A1* | 5/2003 | Gallagher et al. | 705/31 |
| 2003/0126018 A1* | 7/2003 | LaMotta et al. | 705/19 |
| 2003/0144931 A1* | 7/2003 | Stokes et al. | 705/31 |
| 2003/0204460 A1* | 10/2003 | Robinson et al. | 705/35 |
| 2004/0030619 A1* | 2/2004 | Stokes et al. | 705/31 |
| 2004/0078282 A1* | 4/2004 | Robinson | 705/26 |
| 2004/0236647 A1* | 11/2004 | Acharya | 705/30 |
| 2006/0224558 A1* | 10/2006 | Flora et al. | 707/1 |
| 2006/0235776 A1* | 10/2006 | Temme | 705/31 |
| 2007/0050258 A1* | 3/2007 | Dohse | 705/14 |
| 2007/0055571 A1* | 3/2007 | Fox et al. | 705/19 |
| 2007/0055591 A1* | 3/2007 | Enenkiel | 705/31 |
| 2007/0100749 A1* | 5/2007 | Bachu et al. | 705/42 |
| 2007/0255650 A1* | 11/2007 | Destrempes et al. | 705/39 |
| 2008/0177624 A9* | 7/2008 | Dohse | 705/14 |
| 2008/0245854 A1* | 10/2008 | Monden | 235/379 |
| 2008/0301042 A1* | 12/2008 | Patzer | 705/39 |
| 2009/0184164 A1* | 7/2009 | Sparks | 235/382 |

OTHER PUBLICATIONS

"Nebraska: Treatment of software clarified." State Tax Review Mar. 25, 2002: Accounting & Tax Periodicals, ProQuest. Web. Aug. 26, 2010.*

* cited by examiner

SYSTEM AND METHOD FOR DETERMINING PAID TAXES

BACKGROUND

Organizations of all types (e.g., corporations, non-profit groups, academic institutions, households, individuals, trusts, estates, and/or other entities) and individuals associated with these organizations are typically required to complete financial forms. In some cases, these financial forms are completed on an infrequent basis (e.g., once during the life of the organization). In other cases, these financial forms are completed on a frequent basis (e.g., annually, semi-annually, quarterly, and/or other periods of time).

Financial forms are often used to report financial events to a financial body (e.g., a tax authority). Financial forms may be any number of pages long and may be divided into multiple sections, with each section pertaining to one or more financial events. In many cases, financial forms may also be used to determine additional payments and/or credits that result from the reported financial events (e.g., tax bill, tax refund, etc.).

The payment of a tax is an example of a financial event that may be reported by one or more financial forms. A tax is a fee charged (i.e., levied) by a governing body (e.g., municipal government, state government, federal government, etc.) on a product, income, or activity to finance expenditures. Many different types of taxes exist, including sales taxes, luxury taxes, income taxes, alcohol taxes, etc. When a tax is levied directly on personal or corporate income, said tax is referred to as a direct tax. When a tax is levied on the price of a product or service, said tax is referred to as a indirect tax.

SUMMARY

A method for determining paid taxes including obtaining a total price of a purchase following a transaction involving the purchase, determining a tax jurisdiction associated with the first purchase, determining a tax rate based on the tax jurisdiction, extracting a paid tax from the total price based on the tax rate, calculating a tax sum based on the paid tax, and completing a section of a form using the tax sum.

A system for determining paid taxes including a financial record comprising geographical information associated with a purchase and a total price of a purchase, wherein the financial record is generated following a transaction involving the purchase, a tax module configured to extract a paid tax from the total price based on a tax rate determined from the geographical information, and a form generator operatively connected to the tax module and configured to complete a section of a financial form based on the paid tax.

A computer readable medium storing instructions to determine paid taxes, the instructions including functionality to obtain a total price of a purchase following a transaction involving the purchase, determine a tax jurisdiction associated with the first purchase, determine a tax rate based on the tax jurisdiction, extract a paid tax from the total price based on the tax rate, calculate a tax sum based on the paid tax, and complete a section of a form using the tax sum.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for determining paid taxes based on the tax jurisdiction and tax rate of a purchased good and/or service. In general, embodiments of the invention provide a system and method for determining taxes paid and using this information regarding paid taxes to complete a section of a financial form.

Figure 1:
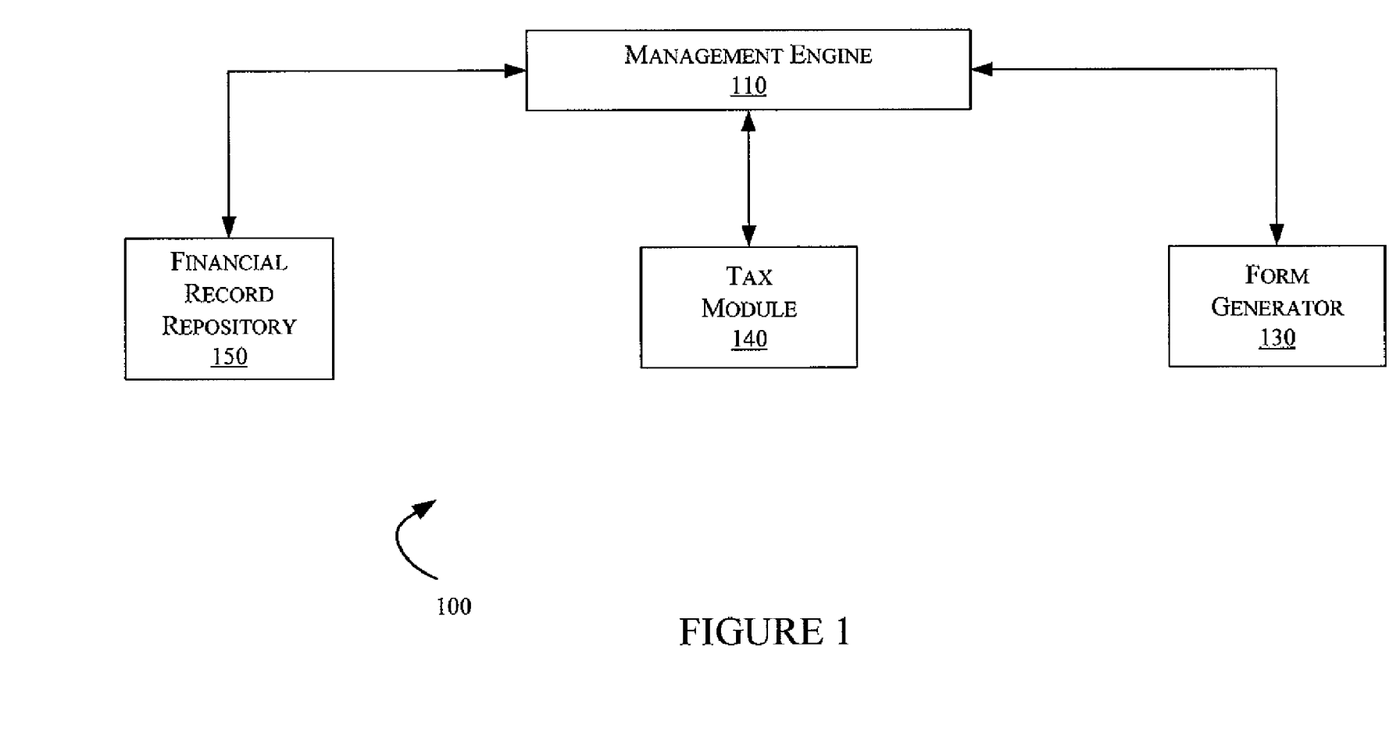
FIG. 1 shows a system in accordance with one or more embodiments of the invention.

FIG. 1 shows a financial management system (100) in accordance with one or more embodiments of the invention. As shown in FIG. 1, the financial management system (100) may have multiple components including a management engine (110), a form generator (130), a tax module (140), and a financial record repository (150). Each of these components are described below and may be located on the same device (e.g., a server, mainframe, desktop personal computer, laptop, personal digital assistant, television, cable box, satellite box, kiosk, telephone, mobile phone, etc.) or may be located on separate devices connected by a network (e.g., the Internet), with wired and/or wireless segments.

In one or more embodiments of the invention, the financial record repository (150) stores one or more financial records. Each financial record in the financial record repository (150) may be associated with one or more purchased goods and/or services. A financial record may include (i) the total price of each purchased good or service, (ii) geographical information for use in determining the tax jurisdiction where each good or service is purchased, and/or (iii) the taxable status of each purchased good or service.

As discussed above, a financial record may include the total price of the purchased good or service. The total price of the purchase may be considered the price of the purchased good or service plus a tax levied, if any, on the purchased good or service. The total price of the purchase, by itself, may not reveal the individual values of the price of the purchase and the levied tax. However, it may be possible to extract the levied tax and/or the price of the purchase from the total price using additional information (discussed below). The levied tax may be, for example, a sales tax, an import tax, an alcohol tax, a tobacco tax, a gas tax, a luxury tax, a consumption tax, a state tax, a federal tax, or any combination of taxes. The levied tax may be (i) a percentage of the price of the purchase (e.g., 8.25%) and/or (ii) a fixed tax amount independent of the price of the purchase (e.g., $25.10).

As discussed above, a financial record may include geographical information for use in determining the tax jurisdiction where the good or service are purchased. The geographical information may include a zip code, a city, a state, a county, a parish, a borough, and/or global position coordinates (e.g., latitude and longitude coordinates). The tax jurisdiction defines a geographical area that has it's own distinct set of tax rules and regulations. The tax rate or fixed tax amount applied to a given good or service may be constant throughout the tax jurisdiction. In other words, regardless of where the good or service is purchased within the tax jurisdiction, the tax rate and/or fixed tax amount is the same. A tax jurisdiction may be of any size including one or more zip codes, a city, a municipality, a county, a parish, a borough, a state, or a country.

As discussed above, a financial record may include the taxable status of the purchased good or service. The taxable status of a purchase indicates whether the purchased good or service is taxable (i.e., whether at least one tax is levied on the purchase) and/or the type of tax, if any, levied on the purchase. Those skilled in the art, having the benefit of this detailed description, will appreciate the taxable status of a purchased good or service is dependent on the tax jurisdiction. In other words, two different tax jurisdictions may levy different types and/or amounts of taxes on the identical purchase. For example, clothing may be taxed in one tax jurisdiction, but not taxed in a neighboring tax jurisdiction.

In one or more embodiments of the invention, the financial record repository (150) is associated with a financial institution (e.g., a bank, a credit union, a credit card company, etc.). A separate financial record repository (150) may exist for each customer of the financial institution. In one or more embodiments of the invention, the financial record repository (150) stores financial records associated with multiple customers of the financial institution. In such embodiments, each financial record in the financial record repository (150) is linked to a specific customer using customer identification numbers, customer account numbers, customer name, customer social security number, customer date of birth, and/or customer address, etc.

In one or more embodiments of the invention, the financial record repository (150) is associated with a financial software product. The financial software product may be used to record (i.e., register) purchases for a variety of users. A separate account may exist within the financial software for each user. The financial records stored in the financial record repository (150) may be associated with an owner (or licensee) of the financial software product and/or anyone permitted by the owner (or licensee) to use the financial software product.

In one or more embodiments of the invention, the financial software product is used to assign purchases to one or more categories. A category may indicate the type of purchased good or service. Accordingly, categories may include automobile expenses, medical expenses, home improvement expenses, insurance premiums, mortgage payments, charitable donations, grocery expenses, etc. In one or more embodiments of the invention, one category includes purchases that are not taxable (e.g., a good or service on which taxes are not levied) (e.g., groceries). Accordingly, the remaining categories may be associated with taxable purchases (e.g., goods or services on which at least one tax is levied).

In one or more embodiments of the invention, the financial record repository (150) is a database, a flat file, or any other type of datastore. New financial records may be added to the financial record repository (150) and existing financial records may be modified or deleted from the financial record repository (150). In one or more embodiments of the invention, the criteria to be associated with a financial repositories can be defined by a user. The criteria may include date of purchase, total price of purchase, geographical location, etc.

In one or more embodiments of the invention, the tax module (140) is configured to (i) determine the tax jurisdiction of a purchase based on the geographical information contained with the corresponding financial record, (ii) determine the taxable status of the purchase, and (iii) calculate the tax paid on a purchased good or service based on (i) and (ii). As discussed above, the tax levied on a purchase may be a percentage of the purchase price and/or a fixed tax amount independent of price. When the levied tax is based, at least in part, on a percentage of the purchase price, the percentage may be referred to as the tax rate.

In one or more embodiments of the invention, the tax module (140) includes one or more look-up tables mapping a tax jurisdiction to a tax rate and/or fixed tax amount. The tax module (140) may have one or more look-up tables for each tax jurisdiction and one or more look-up tables for purchases of different taxable status (i.e., items with different types/amounts of levied taxes). The one or more look-up tables may be stored within the tax module (140) and/or the one or more look-up tables may be associated with a website accessible by the tax module (140). New look-up tables and/or updates to existing tax tables may be obtained from a website, accessible to the tax module (140).

In one or more embodiments of the invention, the form generator (130) is configured to complete forms and/or form sections using the calculated paid tax. The forms may be stored in the form generator (130) or may be stored at a remote site (e.g., a website) (not shown) accessible to the form generator (130). The form generator (130) may also be configured to print the forms and/or transmit them electronically in any format to a third-party.

In one or more embodiments of the invention, the management engine (110) provides an interface to the form generator (130), the tax module (140), and the financial record repository (150). The management engine (110) may be configured, using a graphical user interface (GUI) for example, to accept input (e.g., keyboard input, cursor input, voice commands, etc.) from the user and produce outputs (e.g., on a display screen, printer, audio speakers, etc.). Similarly, a textual-based system may be used in lieu of a GUI.

In one or more embodiments of the invention, the management engine (110) includes a card reader configured to read cards swiped by a user. Information obtained from the card reader may be used to access the financial record repository (150) and for identifying financial records associated with the user.

Figure 2:
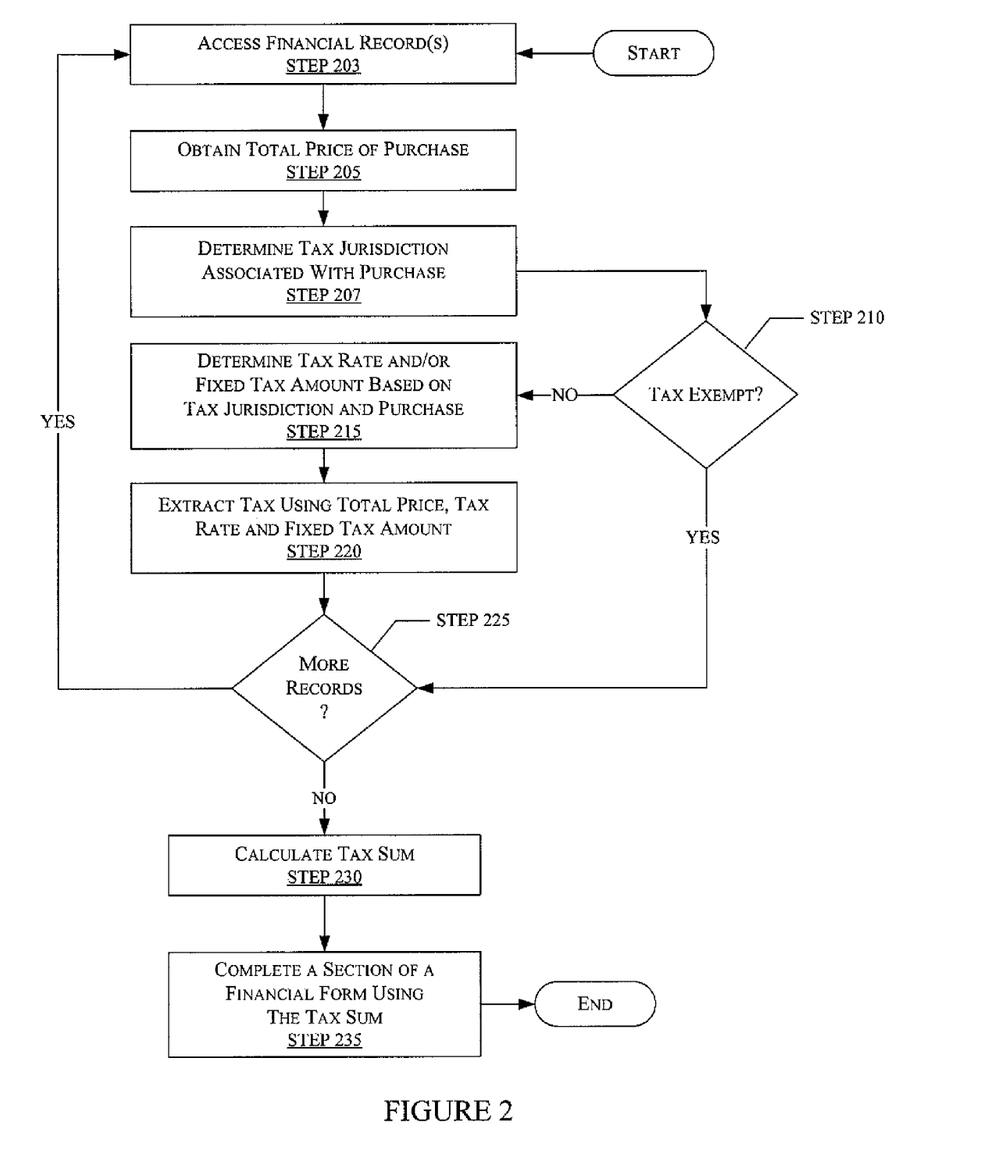
FIG. 2 shows a flowchart in accordance with one or more embodiments of the invention.

FIG. 2 shows a flowchart in accordance with one or more embodiments of the invention. The steps of the flowchart shown in FIG. 2 may be used calculate tax paid on one or more purchases, and for use in completing a financial form or form section. Those skilled in the art, having the benefit of this detailed description, will appreciate the order and number of steps shown in FIG. 2 may differ among embodiments of the invention.

In STEP 203, one or more financial records are accessed. In one or more embodiments of the invention, the financial records are associated with an account at a financial institution (e.g., a credit card account at a credit card company, a bank account at a bank, etc.). In one or more embodiments of the invention, the financial records are associated with a user account in a financial software program. When STEP 203 is initially executed, the user may identify the account by providing, for example, the account number using the keyboard or a card reader. In addition, the user may be authenticated using passwords, personal identification numbers (PINs), biometrics, or any other type of authentication technique.

In STEP 205, the total price of a purchase is obtained. As discussed above the total purchase price includes the price of the good or service plus a tax levied on the good or service.

The total price of the purchase, by itself, may not reveal the individual values of the price of the purchase and the levied tax. However, it may be possible to extract the levied tax and/or the price of the purchase from the total price using additional information (discussed below). The total price of the purchase may be obtained from the accessed financial record(s) (i.e., the one or more records accessed in STEP 203).

In STEP 207, the tax jurisdiction where the good or service was purchased is determined. As discussed above, the tax jurisdiction defines a geographical area that has it's own distinct set of tax rules and regulations. The tax jurisdiction may be determined from the geographical information included in the financial record associated with the purchase.

In STEP 210, it is determined whether the purchased good or service is tax exempt. In one or more embodiments, the accessed financial record (STEP 203) indicates the taxable status of the purchase. As discussed above, the taxable status includes information indicating whether the purchased good or service is taxable. When it is determined the purchased good or service is tax exempt, the process proceeds to STEP 225. When it is determined the purchase is not tax exempt, the process proceeds to STEP 215.

In STEP 215, the tax rate and/or fixed tax amount for the purchase is determined. As discussed above, the tax rate and/or fixed tax amount is based on (i) the tax jurisdiction and/or (ii) the taxable status of the purchased good or service. The tax rate and/or fixed tax amount may be determined from look-up tables associated with the tax jurisdiction and the taxable status.

In STEP 220, the tax levied on the purchased good or service is extracted from the total price of the purchase (STEP 205) and the determined tax rate and/or fixed tax amount (STEP 215). In one or more embodiments of the invention, the tax levied on the purchase is calculated by the following:

$$\text{TAX} = \left[ \frac{TP - FTA}{1 + TR} \right] \times TR + FTA \quad (1)$$

where TAX is the tax levied on the purchase, TP is the total price of the purchase, TR is the tax rate, if any, and FTA is the fixed tax amount, if any. Those skilled in the art, having the benefit of this detailed description, will appreciate that $TR \geq 0$ and $FTA \geq 0$.

In STEP 225, it is determined whether additional financial records exist representing purchased goods or services for which a levied tax needs to be extracted. These additional records may be associated with the same account (e.g., bank account, credit card account, financial software user account, etc.) as the accessed record (STEP 203). When it is determined that additional financial records exist for which a levied tax needs to be determined, the process proceeds to STEP 203. Otherwise, the process proceeds to STEP 230.

In STEP 230, a tax sum is calculated. In one or more embodiments of the invention, a tax sum is the summation of the extracted taxes resulting from multiple iterations of STEP 220. When there is a total of N purchases (i.e., $N \geq 1$), and thus N iterations of STEP 220, the tax sum may be calculated as follows:

$$\text{TAX SUM} = \sum_{k=1}^{N} \left[ \frac{TP_k - FTA_k}{1 + TR_k} \right] \times TR_k + \sum_{k=1}^{N} FTA_k \quad (2)$$

where $TP_k$ is the total purchase price of the $k^{th}$ purchase, $TR_k$ is the tax rate of the $k^{th}$ purchase, and $FTA_k$ is the fixed tax amount of the $k^{th}$ purchase. Those skilled in the art, having the benefit of this detailed description, will appreciate that $TR_k \geq 0$ and $FTA_k \geq 0$.

In one or more embodiments of the invention, only the levied tax associated with the tax rate is calculated. In other words, the levied tax originating from a fixed tax amount is not included in the extracted tax (STEP 220) or calculated tax sum (STEP 230). In such embodiments, the tax sum may be calculated as follows:

$$\text{TAX SUM} = \sum_{k=1}^{N} \left[ \frac{TP_k - FTA_k}{1 + TR_k} \right] \times TR_k \quad (3)$$

where $TP_k$ is the total purchase price of the $k^{th}$ purchase, $TR_k$ is the tax rate of the $k^{th}$ purchase, and $FTA_k$ is the fixed tax amount of the $k^{th}$ purchase. Those skilled in the art, having the benefit of this detailed description, will appreciate that $TR_k \geq 0$ and $FTA_k \geq 0$.

In one or more embodiments of the invention, only the levied tax associated with a fixed tax amount is calculated. In other words, the levied tax originating from the application of a tax rate is not included in the extracted tax (STEP 220) or calculated tax sum (230). In such embodiments, the tax sum may be calculated as follows:

$$\text{TAX SUM} = \sum_{k=1}^{N} FTA_k \quad (4)$$

where $FTA_k$ is the fixed tax amount of the $k^{th}$ purchase. Those skilled in the art, having the benefit of this detailed description, will appreciate that $TR_k \geq 0$ and $FTA_k \geq 0$.

In STEP 235, the calculated tax sum (STEP 230) is used to complete a financial form or form section. The resulting completed form or form section may be stored, printed, and/or electronically transmitted to a third party (e.g., a tax authority) in any format.

Although the process shown in FIG. 2 is directed towards embodiments of the invention with only a single type of levied tax (e.g., a sales tax), those skilled in the art, having the benefit of this detailed description, will appreciate the process shown in FIG. 2 can be expanded to include embodiments where multiple types of taxes are levied against an item (e.g., a sales tax and a luxury tax levied against a single purchase). Once determined, these different types of calculated taxes can be summed together or maintained separate by type (e.g., a tax sum including only paid luxury taxes, a tax sum including only paid sales tax, etc.).

Figure 3:
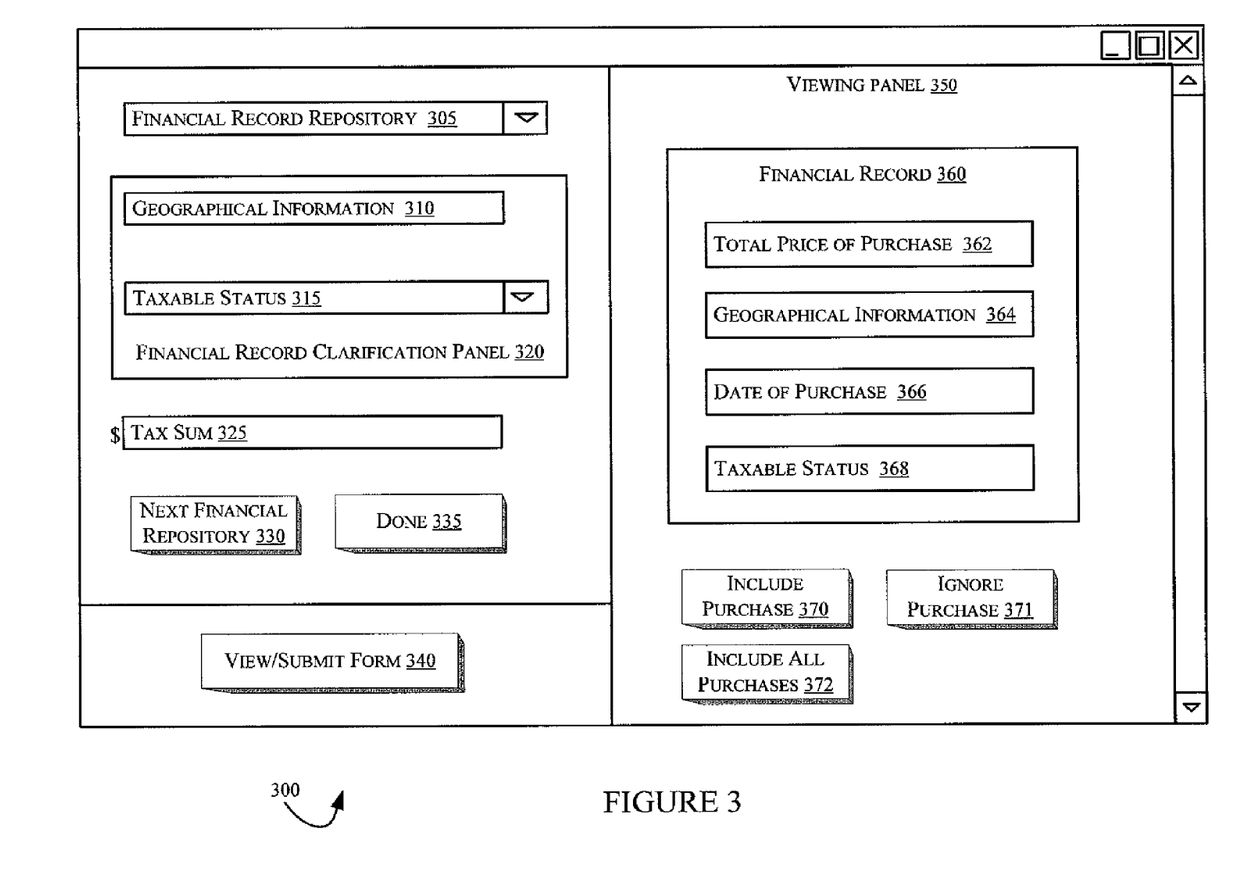
FIG. 3 shows an example interface in accordance with one or more embodiments of the invention.

FIG. 3 shows an example user interface (300) in accordance with one or more embodiments of the invention. The example in FIG. 3 assumes only a sales tax is levied against a purchased good or service. As shown in FIG. 3, the user interface (300) has multiple components including a financial record repository drop-down box (305), a financial record clarification panel (320), a tax sum field (325), multiple buttons (i.e., Next Financial Repository (330), Done (335), View/Submit Form (340)), and a viewing panel (350). The financial record clarification panel (320) may include a geographical information field (310) and a taxable status drop-down box (315). The viewing panel (350) may display a financial record (360) including a total price of purchase (362), geographical information (364), date of purchase (366), and taxable status (368). The viewing panel (350) may also display buttons (i.e., Include Purchase (370), Ignore Purchase (371), Include All Purchases (372)).

In one or more embodiments of the invention, the financial record repository drop-down box (305) is used to select a financial repository. The financial record repository drop-down box (305) may be initially populated through the use of an input device (e.g., card reader, keyboard, microphone, smart card, etc.). The input device may provide a link to one or more financial repositories using account numbers, user IDs, etc.

Once the user has selected a financial repository from the financial record repository drop-down box (305), the viewing panel (350) is used to display the one or more financial records associated with the selected financial repository. When a displayed financial record has inaccurate or missing information regarding the purchase (e.g., missing/erroneous geographical information, missing/erroneous taxable status), a user may complete/correct the financial record (360) using the financial record clarification panel (320). For example, the geographical location field (310) may be used to complete/correct the geographical information (364) of the purchase. Similarly, the taxable status drop-down box (315) may be used to complete/correct the taxable status (368) of the purchase.

In one or more embodiments of the invention, the user can step through the financial records in the selected repository using the include purchase button (370) or the ignore purchase button (371). The use of either button (370, 371) advances the user to the next financial record in the selected financial repository.

Following the selection of the include purchase button (370), an attempt is made to determine the tax paid from the total price of purchase (362), and add said tax to the value in the tax sum textbox (325). No such attempt is made following the selection of the ignore purchase button (371). In one or more embodiments of the invention, following selection of the include all purchases button (372), an attempt is made to determine the paid taxes from the total price of purchase of every financial record in the selected repository. The determined paid taxes are also added to the value in the tax sum textbox (325). Additional repositories may be selected using the next repository button (330). In other words, selection of the next repository button (330) indicates the user is finished with the currently selected repository and intends to select another repository.

In one or more embodiments of the invention, the user selects the done button (335) when no more repositories and/or financial records remain for consideration. Following selection of the done button (335), the value in the tax sum textbox (325) is used to complete a financial form or form section, where the financial form may be selected prior to using the user interface (300). The view/submit form button (340) is used to view the completed financial form or form section (e.g., in viewing panel (350)), print the completed financial form or form section, and/or submit the completed financial form or form section electronically to a third-party in any format.

Those skilled in the art, having the benefit of this detailed description, will appreciate the example discussed above and shown in FIG. 3, may be used to (i) calculate the total sales tax paid by the user on multiple purchases, (ii) complete a section of a financial form (e.g., a tax form) using the calculate total sales tax, and (iii) submit this completed form or form section to a tax body (e.g., the Internal Revenue Service (IRS)) through a paper format or an electronic format.

Figure 4:
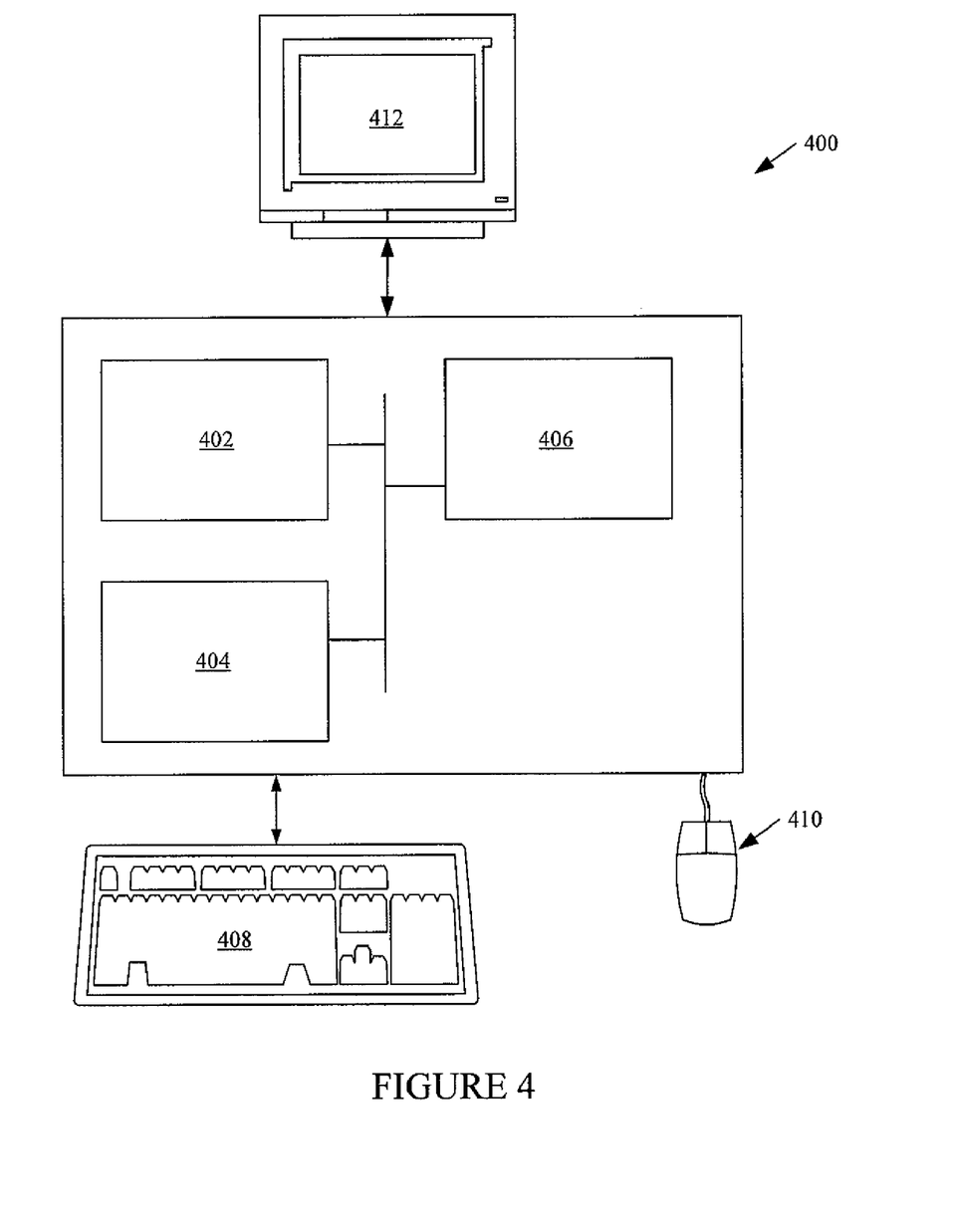
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., Financial Record Repository (150), Management Engine (110), Tax Module (140), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining paid taxes comprising:
recording a total price of a purchase using a financial software product (FSP) executing on a processor and owned by a purchaser of the purchase, wherein the total price is recorded after completion of a transaction involving the purchase;
assigning, within the FSP, the purchase to a category of a plurality of categories comprising a non-taxable category and a plurality of taxable categories;
determining, using the processor and after recording the total price using the FSP owned by the purchaser, a tax jurisdiction associated with the purchase;
determining, using the processor and after recording the total price using the FSP owned by the purchaser, a taxable status of the purchase based on the category assigned to the purchase and the tax jurisdiction;
determining, using the processor and after recording the total price using the FSP owned by the purchaser, a tax rate based on the tax jurisdiction;
extracting, using the processor and after recording the total price, a sales tax from the total price based on the taxable status of the purchase and the tax rate, wherein the total price is obtained from the FSP owned by the purchaser;

calculating, using the processor and after recording the total price using the FSP owned by the purchaser, a tax sum based on the sales tax; and completing a section of a tax form using the tax sum, wherein the tax form is for use in a tax return for the purchaser.

2. The method of claim 1, further comprising:
displaying the tax sum.

3. The method of claim 1, wherein determining the tax rate comprises accessing a look-up table mapping the tax jurisdiction to the tax rate.

4. The method of claim 1, wherein the sales tax comprises a state tax component and a federal tax component.

5. The method of claim 1, wherein the transaction involves ninety-nine purchases.

6. A non-transitory computer readable medium storing instructions to determine paid taxes, the instructions when executed by a computer comprising functionality to:

record a total price of a purchase using a financial software product (FSP) owned by a purchaser of the purchase, wherein the total price is recorded after completion of a transaction involving the purchase;

assign, within the FSP, the purchase to a category of a plurality of categories comprising a non-taxable category and a plurality of taxable categories;

determine, after recording the total price using the FSP owned by the purchaser, a tax jurisdiction associated with the purchase;

determine, after recording the total price using the FSP, a taxable status of the purchase based on the category assigned to the purchase and the tax jurisdiction;

determine, after recording the total price using the FSP owned by the purchaser, a tax rate based on the tax jurisdiction;

extract, after recording the total price, a sales tax from the total price based on the taxable status of the purchase and the tax rate, wherein the total price is obtained from the FSP owned by the purchaser;

calculate, after recording the total price from the FSP owned by the purchaser, a tax sum based on the sales tax; and complete a section of a tax form using the tax sum, wherein the tax form is for use in a tax return for the purchaser.

7. The computer readable medium of claim 6, the instructions further comprising functionality to:
display the tax sum.

8. The computer readable medium of claim 6, wherein the instructions comprising functionality to determine the tax rate further comprise functionality to:
access a look-up table mapping the tax jurisdiction to the tax rate.

9. The computer readable medium of claim 6, wherein the sales tax comprises a state tax component and a federal tax component.

10. The computer readable medium of claim 6, wherein the transaction involves ninety-nine purchases.

11. A system for determining paid taxes comprising:
a processor;
a financial record comprising geographical information associated with a purchase and a total price of the purchase, wherein the financial record is generated after completion of a transaction involving the purchase;
a financial software product (FSP) owned by a purchaser of the purchase and configured to access the financial record after completion of the transaction; and assign the purchase to a category of a plurality of categories comprising a non-taxable category and a plurality of taxable categories;

a tax module executing on the processor and configured to:
obtain the total price from the FSP owned by the purchaser after completion of the transaction;
determine, after obtaining the total price from the FSP, a taxable status of the purchase based on the category assigned to the purchase and the geographical information;
extract, after obtaining the total price from the FSP owned by the purchaser, a sales tax from the total price based on the taxable status of the purchase and a tax rate determined from the geographical information; and
calculate, after obtaining the total price from the FSP owned by the purchaser, a tax sum based on the sales tax; and a form generator executing on the processor, operatively connected to the tax module, and configured to complete a section of a tax form using the tax sum, wherein the tax form is for use in a tax return for the purchaser.

12. The system of claim 11, further comprising:
a financial record repository operatively connected to the tax module and storing the financial record.

13. The system of claim 12, wherein the financial record repository is associated with a financial institution.

14. The system of claim 11, wherein the financial record is a credit card transaction record.

15. The system of claim 11, wherein the tax module is further configured to determine a tax jurisdiction associated with the tax rate from the geographical information.

16. The system of claim 15, wherein the financial record further comprises a taxable status associated with the purchase.

17. The system of claim 11, wherein the form generator is further configured to transmit the section of the tax form to a third party.

18. The system of claim 11, further comprising:
a user interface comprising a card reader and operatively connected to the tax module.

19. The system of claim 11, wherein the financial record is stored on a smart card.

20. The system of claim 11, wherein the tax module comprises a look-up table mapping a tax jurisdiction to the tax rate.

21. The system of claim 11, wherein the transaction involves ninety-nine purchases.

22. The system of claim 11, wherein the sales tax comprises a state tax component and a federal tax component.

23. The method of claim 1, further comprising:
recording the total price in a financial record using the FSP after completion of the transaction.

24. The method of claim 23, wherein the total price is accessed by the FSP at a financial institution after completion of the transaction.

25. The method of claim 1, wherein determining the tax jurisdiction comprises obtaining a zip code of a location of the purchase.

26. The method of claim 1, wherein determining the tax jurisdiction comprises obtaining a city associated with the purchase.

27. The method of claim 1, wherein determining the tax jurisdiction comprises obtaining a geographical coordinate of a location of the purchase.

28. The method of claim 1, wherein determining the tax rate comprises accessing a look-up table on a website mapping the tax jurisdiction to the tax rate.

29. The computer readable medium of claim 6, wherein the instructions to determine the tax jurisdiction comprise functionality to obtain a zip code of a location of the purchase.

30. The computer readable medium of claim 6, wherein the instructions to determine the tax jurisdiction comprise functionality to obtain a city associated with the purchase.

31. The computer readable medium of claim 6, wherein the instructions to determine the tax jurisdiction comprise functionality to obtain a geographical coordinate of a location of the purchase.

32. The computer readable medium of claim 6, wherein the instructions for determining the tax rate comprise functionality to access a look-up table on a website mapping the tax jurisdiction to the tax rate.

\* \* \* \* \*